Dec. 8, 1931.   W. ELMENTHALER   1,835,030
RATTLE PREVENTING AND SEALING MEANS
Original Filed Oct. 18, 1928
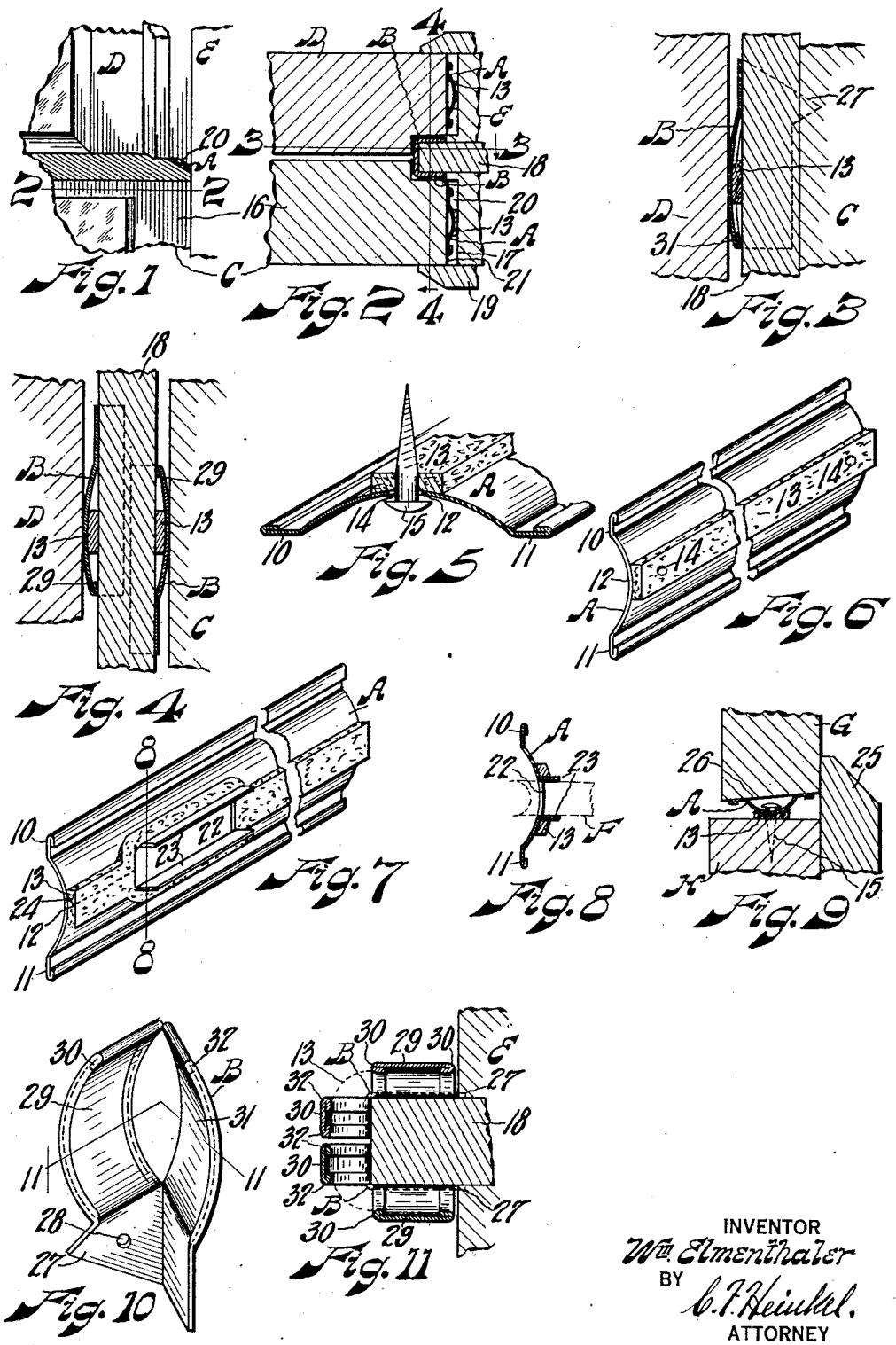

Patented Dec. 8, 1931

1,835,030

UNITED STATES PATENT OFFICE

WILLIAM ELMENTHALER, OF CLEVELAND HEIGHTS, OHIO

RATTLE PREVENTING AND SEALING MEANS

Application filed October 18, 1928, Serial No. 313,298. Renewed October 15, 1931.

My invention relates to means adapted to be interposed or installed between loosely associated elements to prevent rattling or leakage.

Objects of my invention are to provide a simple, inexpensive, easily operable, easily installable, and efficient means whereby elements can not only be held in anti-rattling relation to each other but also can be sealed against leakage. Other objects will appear, or become apparent or obvious, or will suggest themselves upon an inspection of the accompanying drawing or will be pointed out in this specification, or will appear otherwise, or become apparent or obvious, or will suggest themselves upon an inspection of this specification.

In various relatively movable elements, as in doors and windows for instance, it is quite desirable that rattling as well as leakage be prevented. In various instances, as in existing houses for instance, it is quite desirable that anti-rattling and sealing devices be installed and in such installations it is quite desirable that as little as possible of the existing structure needs to be torn down for such installation and that the device can be installed easily and conveniently and that it clears other elements existing between the related elements.

My invention aims to provide a means whereby the advantageous features broadly mentioned above are attained by simple and easily installable means.

In order to illustrate my invention, but not to limit the same, I have shown, in the accompanying drawings, one application of my invention; I am aware however that my invention is applicable to elements or devices or apparatuses other than the one shown in the accompanying drawings mentioned wherein:—

Fig. 1 is a perspective view of a portion of a window having two parts slidable over each other with rattle preventing and sealing means embodying features of my invention interposed between the sash and the frame of the window.

Fig. 2 is a transverse section, taken in a plane indicated by the line 2—2 in Fig. 1, and shows the relation between the rattle preventing and sealing means and the window parts more clearly.

Fig. 3 is a longitudinal section, taken in a plane indicated by the line 3—3 in Fig. 2 and shows relations between some of the members of the rattle preventing and sealing means and the window parts more clearly.

Fig. 4 is a longitudinal section, taken in a plane indicated by the line 4—4 in Fig. 2 and shows the relations between some of the members of the rattle preventing and sealing means and both of the window parts more clearly.

Fig. 5 is a sectional perspective view, on a larger scale, of one of the members of the rattle preventing and sealing means and shows the structure thereof and one manner of holding the same in position.

Fig. 6 is a perspective view of one of the members of the rattle preventing and sealing means.

Fig. 7 is a perspective view similar to Fig. 6 with a a portion thereof bent to clear a rope sheave.

Fig. 8 is a transverse section, taken in a plane indicated by the line 8—8 in Fig. 7 and shows the relations between the sheave and the member more clearly.

Fig. 9 is a sectional view of the lower portion of a door and shows a rattle preventing and sealing means embodying the features of my invention between the lower edge of a door and the door sill.

Fig. 10 is a perspective view of another rattle preventing and sealing member.

Fig. 11 is a section taken in a plane indicated by the line 11—11 in Fig. 10 and shows the relations between this member and the sealing means and the guide way of a window.

Similar reference characters refer to similar parts throughout the views.

In the illustration of my invention, I use the members A and B to interpose the same between the loosely associated window parts C and D and the window frame E. The member A alone as well as the member B alone can prevent rattling and seal the window parts; either one can be installed individually or both of them can be installed depending upon desire or different conditions found in practice.

All of the members are shown and described as positionally located on the window frame to slide on the window parts but they can also be reversed and positionally located on the window parts to slide on the window frame.

The member A, in the present instance, is made of resilient material, preferably a non-corrosive material, of one strip of a length about equal to the length of the part of the window where it is to be used.

The longitudinal edge portions of the piece are doubled over or beaded throughout the length thereof to form the longitudinal beaded contact portions or faces 10 and 11 and the cross-sectionally middle portion of the piece is arched throughout the length thereof to form the longitudinal contact portion 12.

The beads stiffen the structure as well as prevent a cutting edge from being formed on the outer longitudinal edges to prevent an element in contact with the portions 10 and 11 from being injured.

As shown, the portions 10 and 11 are in one plane while the portion 12 is in a different plane so that the portions 10 and 11 may contact one element and the portion 12 may contact another element which may be called a three point suspension.

In order to provide a sealing means, I attach the sealing strip 13 of resilient compressible material, such as felt or other material of a similar or equivalent nature, or a member similar to the member A contacting back to back, onto the outside of the portion 12 as best seen in Fig. 5.

Holes 14 are provided through the portion 12 and through the strip 13 and a strip retaining means 15, extends through the holes with considerable clearance therein as seen in Fig. 5. The head of the screws does not contact the inner surface of the portion 12 but is spaced therefrom as shown. This screw arrangement prevents displacement of the member A but it does not hold the same in position rigidly so that the arched portion 12 can rock on the seat thereof and the member as a whole has more freedom to adjust itself to varying conditions without impediment by the screws.

Referring now more particularly to Fig. 1.

The window C, a movable element, slidable upwardly to open the window and downwardly to close the same, has the sash 16 one side of which can slide vertically in the groove or guideway 17 defined by the cleats 18 and 19 and the window frame E, a stationary or positionally fixed element, with the usual clearance space 20 exaggerated for clearness in the drawings.

The member A can be placed into the space 20 from the top down while the window C is open with the sealing strip 13 against the bottom of the groove 17. The screws 15 are then inserted and screwed into the frame E with the heads thereof free of the member as previously explained while the window C is open. Nails or other similar means can be used in place of the screws.

When the member A is in place, the portions 10 and 11 contact the edge 21 of the window and the strip 13 contacts the bottom of the groove and, due to the resiliency of the member A, a seal is thereby effected between the window and the frame thereof.

When the window is being moved, or while it is stationary, the resiliency of the member A, aided by the rockability thereof, causes the portions 10 and 11 and the strip 13 to follow or automatically adjust itself to inequalities or existing conditions between the window and the frame thereof and thereby automatically maintain a seal between the window and the frame in any position of the window.

The resilient contact of the portions 10 and 11 on the window creates sufficient friction between the member A and the window to prevent rattling thereof and also seals the joint between the member A and the window and the strip 13 seals the joint between the member A and the frame so that the member A prevents rattling and also seals the joints between the window and the frame or other movable and stationary elements.

The member A can be, and preferably is, used on both sides of the window. When the member A is installed only on one side of a window, the resiliency thereof abuts the other side of the window against the frame with sufficient force to prevent rattling and to seal this other side also.

A member A can also be installed between the upper sash member of the window C and between the lower sash member of the window D in a manner described above and can also be installed between the lower sash member of the window C and the frame and between the upper sash member of the window D and the frame in a manner illustrated in Fig. 9.

When a sheave for a balance rope or other obstruction exists in the groove 17, a hole can easily be cut through the thin material of the member A to clear the obstruction as illustrated in Fig. 7 wherein the hole 22 is shown as formed by slitting the member A, and bending the slitted portions outwardly to form the ears 23 which can also serve the purpose of localizing that portion of the member A by abutting the walls of a hole in the frame or by abutting the sides of the sheave F.

When the member A is to be installed without removing parts of an existing structure and when obstructions exist in the groove 17, a slit, represented by the line 24 in Fig. 7, can easily be cut through one end of the member A from the hole 22 outwardly where-upon the resiliency of the material of the member A permits the parts of the slitted portion to be bent temporarily to clear the obstruction. When the member A is in position, a few nails can be inserted adjacent to the slit to strengthen the portion weakened by the slit.

The member A can also be used on pivoted elements, such as pivoted doors, one illustration of which feature is shown in Fig. 9.

The door G a movable element, is mounted in the frame H, a stationary element, and abuts the strip 25 when the door is closed and has the edge 26 which is usually beveled.

The member A is interposed between the edge 26 of the door G and the frame H; the portions 10 and 11 thereof contact the edge 26 while the strip 13 thereof contacts the frame and the screw 15 retains the device in position as described above.

The member A can rock on the frame H and thereby adjust itself automatically to the beveled edge 26 or other existing conditions.

The frictional contact between the portions 10 and 11 and the edge 26, caused by the resiliency of the material of the member A, prevents rattling of the door as well as sealing the same and the strip 13 seals the frame so that a seal is formed between the movable door and the stationary frame.

The member B is formed of resilient material, preferably a non-corrosive material, and has the flange portion 27 having the hole 28 for a fastening means, and the curved portion 29 having the beads 30 formed on the longitudinal edges thereof to stiffen the portion 29 as well as to prevent a cutting edge from being formed thereon, and also has the curved portion 31 at right angles to the curved portion 29 and the beads 32 on the longitudinal edges thereof to stiffen the portion 31 as well as to prevent a cutting edge from being formed thereon.

The member B can be installed between a window and the guide means thereof and is fastened to the cleat 18. The portion 31 contacts the edge 21 and thereby moves the window laterally in one direction and the portion 30 moves the window laterally in another direction and thereby prevents movement between the windows and between the windows and the frame.

One or more members B can be installed either on one side of a window or on both sides thereof as well as between the upper and lower sash members of the windows. The resiliency of the members B holds the windows against rattling and effects sealing.

The sealing strip 13 is interposed between the member B and the cleat 18 for sealing purposes.

The members shown and described are simple in structure, prevent rattling as well as provide a seal between loosely associated elements, and are easily installable either in existing or in new structures.

As previously mentioned, I am aware that my invention is applicable to elements or devices or apparatuses other than the windows and doors shown and described and I am also aware that changes and modifications can be made in the structure of the device shown and described within the scope of the appended claims; therefore, without limiting myself to the precise application of my invention nor to the precise structure shown and described, I claim:—

1. A means of the character described adapted to be installed between an element longitudinally movable in relation to another element including a strip like member of resilient material adapted to be inserted between said elements lengthwise thereof, arched transversely to bridge space between and contact both of said elements through three faces freely contacting thereon, beaded at both longitudinal edges to eliminate cutting edges and devoid of stiffening means on the non-contacting parts thereof so that the member can adjust itself automatically to conditions between said elements occasioned by relative movement thereof.

2. A means of the character described adapted to be installed between an element longitudinally movable in relation to another element including a strip like member of resilient material adapted to be inserted between said elements lengthwise thereof, arched transversely to bridge space between and contact both of said elements through three faces freely contacting thereon, beaded at both longitudinal edges to eliminate cutting edges and devoid of stiffening means on the non-contacting parts thereof so that the member can adjust itself automatically to conditions between said elements occasioned by relative movement thereof, and spaced retaining members extendable loosely through the arched part of said strip like member to loosely localize the same.

3. A means of the character described adapted to be installed between an element longitudinally movable in relation to another element including a strip like member of resilient material adapted to be inserted between said elements lengthwise thereof, arched transversely to fill space between and contact both of said elements, beaded at both longitudinal edges to eliminate cutting edges and devoid of stiffening means on the non-contacting parts thereof so that the member can adjust itself automatically to conditions between said elements occasioned by relative movement thereof, a sealing strip between the top of the arched part of said strip like member and the part of the element adjacent thereto, and spaced retainer members extendable through said strip like member and said sealing strip and adapted to loosely localize said strip like member.

4. A means of the character described adapted to be installed between an element longitudinally movable in a groove in another element, including, a member having a portion for attachment thereof onto a wall of said groove, a resilient arcuate portion extending inwardly of said groove and toward the longitudinal opening thereof to contact a side edge of the longitudinally movable element, and a resilient arcuate portion extending inwardly of said groove and transversely of the longitudinal opening thereof to contact a side of the longitudinally movable element.

5. A means of the character described adapted to be installed between an element longitudinally movable in a groove in another element, including, a member having means for attachment thereof onto a wall of said groove and to contact longitudinally therein, a resilient arcuate portion extending inwardly of said groove and toward the longitudinal opening thereof to contact a side edge of the longitudinally movable element, a resilient arcuate portion extending inwardly of said groove and transversely of the longitudinal opening thereof to contact a side of the longitudinally movable element, and a sealing member between an arcuate portion of said member and a wall of said groove.

6. A means of the character described adapted to be installed between an element longitudinally movable in a groove in another element, including, a member having a portion for attachment thereof onto a wall of said groove, a resilient arcuate portion extending inwardly of said groove and toward the longitudinal opening thereof to contact a side edge of the longitudinally movable element, a resilient arcuate portion extending inwardly of said groove and transversely of the longitudinal opening thereof to contact a side of the longitudinally movable element, and beads on edges thereon of said arcuate portions to eliminate cutting edges.

7. A means of the character described adapted to be installed between an element longitudinally movable in a groove in another element, including, a member having means for attachment thereof onto a wall of said groove and to contact longitudinally therein, a resilient arcuate portion extending inwardly of said groove and toward the longitudinal opening thereof to contact a side edge of the longitudinally movable element, a resilient arcuate portion extending inwardly of said groove and transversely of the longitudinal opening thereof to contact a side of the longitudinally movable element, and a strip like member of resilient material adapted to be inserted between said elements lengthwise thereof and arched transversely to contact both of said elements.

8. A means of the character described adapted to be installed between an element longitudinally movable in a groove in another element, including, a member having means for attachment thereof onto a wall of said groove and to contact longitudinally therein, a resilient arcuate portion extending inwardly of said groove and toward the longitudinal opening thereof to contact a side edge of the longitudinally movable element, a resilient arcuate portion extending inwardly thereof to contact a side of the longitudinally movable element, a strip like member of resilient material adapted to be inserted between said elements lengthwise thereof, arched transversely to fill space between and contact both of said elements, beaded at both longitudinal edges to eliminate cutting edges and devoid of stiffening means on the non-contacting parts thereof so that the member can adjust itself automatically to conditions between said elements occasioned by relative movement thereof.

9. A means of the character described adapted to be installed between an element longitudinally movable in a groove in another element, including, a member having means for attachment thereof onto a wall of said groove and to contact longitudinally therein, a resilient arcuate portion extending inwardly of said groove and toward a longitudinal opening thereof to contact a side edge of the longitudinally movable element, a resilient arcuate portion extending inwardly of said groove and transversely of the longitudinal opening thereof to contact a side of the longitudinally movable element, a sealing member between an arcuate portion of said member and a wall of said groove, a sealing strip between the top of the arched part of said strip like member and the part of the element adjacent thereto, and spaced retainer members extendable through said strip like member and said sealing strip and adapted to loosely localize said strip like member.

10. A means of the character described adapted to be installed between an element longitudinally movable in a groove in another element, including, a member having means for attachment thereof onto a wall of said groove and to contact longitudinally therein, a resilient arcuate portion extending inwardly of said groove and toward the longitudinal opening thereof to contact a side edge of the longitudinally movable element, a resilient arcuate portion extending inwardly of said groove and transversely of the longitudinal opening thereof to contact a side of the longitudinally movable element, beads on the contacting edges of said arcuate portions to eliminate cutting edges, a strip like member of resilient material adapted to be inserted between said elements lengthwise thereof, arched transversely to fill space between and contact both of said elements, beaded at both longitudinal edges to eliminate cutting edges and devoid of stiffening means on the non-contacting parts thereof so that the member can adjust itself automatically to conditions between said elements occasioned by relative movement thereof.

11. A means of the character described adapted to be installed between an element longitudinally movable in a groove in another element, including, a member having means for attachment thereof onto a wall of said groove and to contact longitudinally therein, a resilient arcuate portion extending inwardly of said groove and toward the longitudinal opening thereof to contact a side edge of the longitudinally movable element, a resilient arcuate portion extending inwardly of said groove and transversely of the longitudinal opening thereof to contact a side of the longitudinally movable element, a sealing member between an arcuate portion of said member and a wall of said groove, beads on the contacting edges of said arcuate portions to eliminate cutting edges, a strip like member of resilient material adapted to be inserted between said elements lengthwise thereof, arched transversely to fill space between and contact both of said elements, beaded at both longitudinal edges to eliminate cutting edges and devoid of stiffening means on the non-contacting parts thereof so that the member can adjust itself automatically to conditions between said elements occasioned by relative movement thereof, a sealing strip between the top of the arched part of said strip like member and the part of the element adjacent thereto, and spaced retainer members extendable through said strip like member and said sealing strip and adapted to loosely localize said strip like member.

12. A rattle preventing and sealing member for related elements of resilient material insertable longitudinally between related elements and having a cross-sectionally arched portion extending longitudinally thereof for sealing and rattle preventing contact on one of the elements and a cross sectionally flat portion on each extending longitudinally thereof for sealing and rattle preventing and wear reducing and sliding contact on the other one of the elements; said member being compressible transversely for insertion thereof in space between the elements and self expansible transversely to bridge the space.

13. In a rattle preventing and sealing means for related elements, a member of resilient material installable longitudinally between the elements and having a cross-sectionally arched portion extending longitudinally thereof, a cross-sectionally flat portion on each side of the arched portion each extending longitudinally thereof for sealing and rattle preventing and wear reducing and sliding contact on one of the elements, and a resiliently compressible strip on the top of the arched portion of the member for sealing and rattle preventing contact on the other one of the elements; said member being compressible transversely for insertion thereof into space between the elements and self expansible transversely to bridge the space.

14. As an article of manufacture, a rattle preventing and sealing member, made of one piece of resilient material, preferably corrosion proof material, arched transversely through the length thereof and having a flat portion on each side of the arched portion longitudinally of the arched portion and beaded on the outer longitudinal edges thereof.

15. As an article of manufacture, a rattle preventing and sealing member, made of one piece of resilient material, preferably corrosion proof material, arched transversely through the length thereof and having a flat portion on each side of the arched portion longitudinally of the arched portion and beaded on the outer longitudinal edges thereof, and a resiliently compressible sealing strip longitudinally on the top of said arched portion.

In testimony of the foregoing, I affix my signature.

WILLIAM ELMENTHALER.